US012202771B2

(12) United States Patent
Shimozaki et al.

(10) Patent No.: US 12,202,771 B2
(45) Date of Patent: Jan. 21, 2025

(54) FRICTION MATERIAL

(71) Applicant: NISSHINBO BRAKE, INC., Tokyo (JP)

(72) Inventors: Akihiko Shimozaki, Gunma-ken (JP); Takuto Nishikawa, Gunma-ken (JP); Takeshi Tanabe, Gunma-ken (JP)

(73) Assignee: NISSHINBO BRAKE, INC., Tokyo (JP)

( * ) Notice: Subject to any disclaimer, the term of this patent is extended or adjusted under 35 U.S.C. 154(b) by 448 days.

(21) Appl. No.: 17/629,369

(22) PCT Filed: Jul. 10, 2020

(86) PCT No.: PCT/JP2020/026982
§ 371 (c)(1),
(2) Date: Jan. 22, 2022

(87) PCT Pub. No.: WO2021/015003
PCT Pub. Date: Jan. 28, 2021

(65) Prior Publication Data
US 2022/0250984 A1    Aug. 11, 2022

(30) Foreign Application Priority Data

Jul. 23, 2019  (JP) .................................. 2019-135373

(51) Int. Cl.
| | | |
|---|---|---|
| *C04B 14/02* | (2006.01) | |
| *C04B 14/04* | (2006.01) | |
| *C04B 14/06* | (2006.01) | |
| *C04B 24/00* | (2006.01) | |
| *C04B 26/12* | (2006.01) | |
| *C04B 111/00* | (2006.01) | |
| *F16D 69/02* | (2006.01) | |

(52) U.S. Cl.
CPC .......... *C04B 26/122* (2013.01); *C04B 14/024* (2013.01); *C04B 14/046* (2013.01); *C04B 14/062* (2013.01); *C04B 24/008* (2013.01); *C04B 2111/00362* (2013.01); *F16D 69/02* (2013.01); *F16D 69/026* (2013.01); *F16D 2200/0069* (2013.01)

(58) Field of Classification Search
CPC ... C04B 26/122; C04B 14/024; C04B 14/046; C04B 14/062; C04B 24/008; C04B 2111/00362; C04B 14/02; C04B 14/04; C04B 14/06; C04B 24/00; C04B 26/12; F16D 69/02; F16D 69/026; F16D 2200/0069; F16D 2200/006; C08L 61/06; C08L 61/14; C08L 2205/16; C08L 77/10; C08L 91/00; C08L 19/003; C09K 3/14; C08K 2003/2244; C08K 2003/3009; C08K 2003/3045; C08K 3/04; C08K 3/22; C08K 3/30; C08K 3/36
See application file for complete search history.

(56) References Cited

U.S. PATENT DOCUMENTS

| | | | | |
|---|---|---|---|---|
| 2,408,430 | A | * | 10/1946 | Lowey .................. F16D 69/027 188/218 XL |
| 5,889,080 | A | * | 3/1999 | Kaminski ............. F16D 69/026 525/142 |
| 2017/0030426 | A1 | * | 2/2017 | Nagashima .............. C09K 3/14 |
| 2018/0298971 | A1 | * | 10/2018 | Yaguchi ............... C09K 3/1463 |
| 2019/0063535 | A1 | | 2/2019 | Mitsumoto | |

FOREIGN PATENT DOCUMENTS

| | | | |
|---|---|---|---|
| CN | 107892789 A | 4/2018 | |
| JP | 2016-98362 | 5/2016 | |
| JP | 2016-121243 | 7/2016 | |
| JP | 2017071711 A * | 4/2017 | ........... C09K 3/1436 |
| JP | 2017-193612 | 10/2017 | |

OTHER PUBLICATIONS

Search report issued on Jul. 6, 2023 by European Patent Office.

\* cited by examiner

*Primary Examiner* — Anthony J Green
*Assistant Examiner* — Marites A Guino-O Uzzle
(74) *Attorney, Agent, or Firm* — Apex Juris, pllc; Tracy M Heims

(57) ABSTRACT

To provide the friction material for the disc brake pad manufactured by forming the NAO friction material composition, enabling to restrain the brake vibration during braking in a high temperature. The NAO friction material composition does not contain the copper component but contains, relative to the entire amount of the friction material composition, 5-9 weight % of the binder with 1-4 weight % of the silicone rubber modified phenol resin as a part of the binder, the fiber base, 1-4 weight % of a cashew dust as the organic friction modifier, 0.5-3 weight % of a fused silica with the average particle diameter of 15-40 μm as the inorganic friction modifier, and 0.1-2 weight % of the electromelting zirconium silicate beads with the average particle diameter of 10-30 μm as the lubricant.

2 Claims, No Drawings

FRICTION MATERIAL

FIELD OF INVENTION

This invention relates to a friction material for a disc brake pad, which is manufactured by forming a Non-Asbestos-Organic (NAO) friction material composition that contains a binder, a fiber base, an organic friction modifier, an inorganic friction modifier, and a lubricant but does not contain a copper component.

BACKGROUND OF INVENTION

Conventionally, a disc brake is utilized as a brake device for a passenger vehicle, and a disc brake pad having a metal base member to which a friction material is affixed is used as a friction member.

The friction material for the disc brake pad is mainly classified into three types.
<Semi-Metallic Friction Material>

A semi-metallic friction material contains 30 weight % or more but less than 60 weight % of a steel fiber as the fiber base relative to the entire amount of the friction material composition.
<Low Steel Friction Material>

A low steel friction material contains a steel fiber in a part of the fiber base and contains less than 30 weight % of the steel fiber relative to the entire amount of the friction material composition.
<Non-Asbestos-Organic (NAO) Friction Material>

An NAO friction material does not contain the steel base fibers such as the steel fiber and a stainless fiber as a fiber base.

Also, in convention friction materials, in order to secure the required performance, about 5-20 weight % of copper components such as a copper fiber or a copper particle and a copper alloy fiber or a copper alloy particle relative to the entire amount of the friction material composition is added as a necessary component.

However, it is recently suggested that the conventional friction materials show a possibility of polluting water areas by discharging the copper in the friction powder during braking and allowing the discharged copper to flow in the water areas such as rivers, lakes, and oceans.

Because of this copper pollution problem, California State and Washington State of the United States of America passed a bill to prohibit the sales of the friction member using the friction material containing 5 weight % or more of the copper component relative to the entire amount of the friction material composition, an act of assembling the subject friction member in a new car from the year of 2021, and further sales of the friction member using the friction material containing 0.5 weight % or more of the copper component relative to the entire amount of the friction material composition and an act of assembling the subject friction member in a new car several years later from 2021.

As this type of laws and regulations are expected to be spread out in the world from now on, the elimination of the copper component contained in the friction material is urgently needed.

However, the elimination of the copper contained in the friction material has problems of reducing a thermal conductivity of the friction material, hindering a thermal diffusion of a friction surface on the friction material during braking in a high temperature, and increasing the amount of wear of the friction material, and also causing a brake vibration due to an uneven increase of the friction surface temperature.

Patent Document 1 and Patent Document 2 are listed as the prior arts.

Patent Document 1 describes the friction material composition and the friction material that is manufactured by forming the friction material composition that contains the binder, the organic filler, the inorganic filler, and the fiber base. The friction material composition does not contain the copper in the friction material composition as an element or contains 0.5 mass % or less of the copper component relative to the entire amount of the friction material composition, and contains 2-5 mass % of the steel fiber with the fiber length of 2500 µm or less.

Patent Document 2 describes the friction material composition and the friction material that is manufactured by forming the binder, the organic filler, the inorganic filler, and the fiber base. The friction material composition does not contain the copper component as an element or contains 0.5 mass % or less of the copper component relative to the entire amount of the friction material composition, and further contains 2-5 mass % of the steel fiber with the fiber length of 2500 µm or less. A titanate, which has a tunnel crystal structure and a layered crystal structure, is a necessary component in the friction material composition.

According to the inventions in Patent Document 1 and Patent Document 2, the brake vibrations occurring during braking in a high temperature may be restrained without containing the copper component that has a high environmental load.

However, the friction materials in Patent Document 1 and Patent Document 2 are the low steel friction materials that contains the steel fiber as the fiber base, and have a problem of likely to increase the contamination on a wheel and likely to cause a brake noise.

NAO friction material, which does not contain the steel base fibers such as the steel fiber and the stainless fiber as the fiber base, is known for example in Patent Document 3 and has less problem of causing the contamination on the wheel and the brake noise; however, no effective means to resolve the problem of the brake vibration during braking in a high temperature has been established yet.

PRIOR ART(S)

Patent Documents

[Patent Document 1] Japanese Provisional Patent Publication No. 2016-98362
[Patent Document 2] Japanese Provisional Patent Publication No. 2016-121243
[Patent Document 3] Japanese Provisional Patent Publication No. 2017-193612

SUMMARY OF INVENTION

Problems to be Resolved by Invention

This invention provides a friction material for the disc brake pad, which is manufactured by forming the NAO friction material composition that contains the binder, the fiber base, the organic friction modifier, the inorganic friction modifier, and the lubricant but does not contain the copper component, and the friction material can restrain the brake vibration during braking in a high temperature.

Means to Resolve the Problems

The brake vibration during braking in a high temperature is assumed to occur in the following mechanism. For the friction material, the cashew dust as the organic friction modifier are added in the friction material in order to secure the braking effectiveness.

As the temperature of the friction surface of the disc rotor reaches a high temperature range due to the braking at a high speed, the cashew dust that is contained in the friction material is thermally decomposed, which generates a tar-like substance. This tar-like substance transfers to irregularly adhere to the friction surface of the disc rotor, which forms a film covering the friction surface. Then, repeating the braking at a high speed further increases the temperature on the friction surface of the disc rotor.

At this time, the friction surface of the disc rotor, especially a thick portion of the friction surface of the disc rotor, to which the film of the tar-like substance is transferred and adhered, reaches to the high temperature range and is thermally expanded, which creates the thickness difference on the friction surface.

Also, because of the heat accumulation in the friction material, the friction surface of the friction material expands irregularly and an attachment or a contact between the disc rotor and the friction material becomes irregular, which causes the brake vibration.

Inventors of this invention, after serious investigation, found that in the friction material for the disc brake pad, which is manufactured by forming the NAO friction material composition that contains the binder, the fiber base, the organic friction modifier, the inorganic friction modifier, and the lubricant but does not contain the copper component, the formation of the film of the tar-like substance on the friction surface during braking in a high temperature can be controlled to effectively reduce the brake vibration during braking in a high temperature by the friction material composition containing the predetermined amount of the binder which includes the predetermined amount of the silicone rubber modified phenol resin as a part of the binder, the predetermined amount of the cashew dust as the organic friction modifier, the predetermined average particle diameter of a fused silica as the inorganic friction modifier, and the predetermined average particle diameter of an electromelting zirconium silicate beads as the inorganic friction modifier.

This invention relates to the friction material for the disc brake pad, which is manufactured by forming the NAO friction material composition that contains the binder, the fiber base, the organic friction modifier, the inorganic friction modifier, and the lubricant but does not contain the copper component, and is based on the following technology.

(1) The friction material for the disc brake pad, which is manufactured by forming the Non-Asbestos-Organic (NAO) friction material composition that does not contain the copper component but contains the binder, the fiber base, the organic friction modifier, the inorganic friction modifier, and the lubricant, in which the friction material composition contains 5-9 weight % of the binder relative to the entire amount of the friction material composition, 1-4 weight % of a silicone rubber modified phenol resin as a part of the binder relative to the entire amount of the friction material composition, 1-4 weight % of a cashew dust as the organic friction modifier relative to the entire amount of the friction material composition, 0.5-3 weight % of a fused silica with an average particle diameter of 15-40 μm as the inorganic friction modifier relative to the entire amount of the friction material composition, and 0.1-2 weight % of an electromelting zirconium silicate beads with an average particle diameter of 10-30 μm as the inorganic friction modifier relative to the entire amount of the friction material composition.

(2) The friction material according to the above-(1), in which the friction material composition contains 1-4 weight % of the resilient graphite cokes as the lubricant relative to the entire amount of the friction material composition.

Advantage of Invention

This invention provides the friction material for the disc brake pad, which is manufactured by forming the NAO friction material composition that contains the binder, the fiber base, the organic friction modifier, the inorganic friction modifier, and the lubricant but does not contain the copper component, and the friction material can restrain the brake vibration during braking in a high temperature.

EMBODIMENTS OF THE INVENTION

This invention relates to the NAO friction material composition that does not contain the copper component but contains the binder, the fiber base, the organic friction modifier, the inorganic friction modifier, and the lubricant, which contains 5-9 weight % of the binder relative to the entire amount of the friction material composition, 1-4 weight % of the silicone rubber modified phenol resin as a part of the binder relative to the entire amount of the friction material composition, 1-4 weight % of the cashew dust as the organic friction modifier relative to the entire amount of the friction material composition, 0.5-3 weight % of the fused silica with an average particle diameter of 15-40 μm as the inorganic friction modifier relative to the entire amount of the friction material composition, and 0.1-2 weight % of the electromelting zirconium silicate beads with an average particle diameter of 10-30 μm as the inorganic friction modifier relative to the entire amount of the friction material composition.

<Binder, Silicone Rubber Modified Phenol Resin>

Adding the silicone rubber modified phenol resin as a part of the binder can enlarge the amount of a high compressibility. When the thickness difference due to the irregular adhesion of the film of the tar-like substance on the friction surface of the disc rotor occurs, if the amount of the high compressibility is large, the friction material follows and ultimately adjusts the thickness difference, so that the attachment or the contact between the friction material and the friction surface of the disc rotor becomes even, which restrains the brake vibration.

The amount of the binder contained in the friction material composition relative to the entire friction material composition is 5-9 weight %, and the amount of the silicone rubber modified phenol resin contained in the friction material composition relative to the entire friction material composition is 1-4 weight %. However, the amount of the binder contained in the friction material composition relative to the entire friction material composition is preferably 6-8 weight %, and the amount of the silicone rubber modified phenol resin contained in the friction material composition relative to the entire friction material composition is preferably 2-3 weight %. If the amount of the binder contained in the friction material composition is less than 5 weight % relative to the entire amount of the friction material composition, a sufficient wear resistance cannot be obtained, and if the amount of the binder contained in the friction material composition is over 9 weight % relative to the entire amount of the friction material composition, a sufficient fading resistance cannot be obtained.

Also, the amount of the silicone rubber modified phenol resin contained in the friction material composition is less than 1 weight % relative to the entire amount of the friction material composition, a sufficient inhibitory effect cannot be obtained, and if the amount of the silicone rubber modified phenol resin contained in the friction material composition is over 4 weight %, a fading resistance is reduced.

For the binders other than the silicone rubber modified phenol resin, either one of binders that are generally used for the friction material such as a straight phenol resin, a cashew oil modified phenol resin, an acrylic rubber modified phenol resin, a nitrile rubber (NBR) modified phenol resin, a phenol aralkyl resin (aralkyl modified phenol resin), or a fluoropolymer dispersed phenol resin, or a combination of two or more of the above-identified binders may be used.

<Cashew Dust>

As the amount of cashew dust as the organic friction modifier added to the friction material composition is reduced to a relatively small amount, a favorable braking effectiveness can be achieved while the generation of the tar-like substance during braking in a high speed is being restrained.

The amount of the cashew dust added to the friction material composition relative to the entire amount of the friction material composition is preferably 1-4 weight % and is preferably 1.5-2 weight %.

If the amount of the cashew dust added to the friction material composition relative to the entire amount of the friction material composition is less than 1 weight %, the braking effectiveness becomes insufficient, and if the amount of the cashew dust added to the friction material composition relative to the entire amount of the friction material composition is over 4 weight %, the tar-like substance transfers to irregularly adhere to the friction surface of the disc rotor during braking in a high speed, which tends to cause the brake vibration.

<Fused Silica, Electromelting Zirconium Silicate Beads>

As the predetermined amount of the fused silica with the average particle diameter of 15-40 μm and the predetermined amount of the electromelting zirconium silicate beads with the average particle diameter of 10-30 μm, both as the inorganic friction modifiers, are added to the friction material composition, the film of the tar-like substance formed on the friction surface can be cleaned moderately without over grinding the friction surface of the mating member, and therefore the occurrence of the brake vibration due to the irregular transfer and adherence of the tar-like substance to the friction surface can be prevented.

The amount of the fused silica with the average diameter of 15-40 μm added to the friction material composition relative to the entire amount of the friction material composition is 0.5-3 weight %, and the amount of the electromelting zirconium silicate beads with the average diameter of 10-30 μm added to the friction material composition relative to the entire amount of the friction material composition is 0.1-2 weight %. The amount of the fused silica with the average diameter of 15-40 μm added to the friction material composition relative to the entire amount of the friction material composition is preferably 1-2 weight %, and the amount of the electromelting zirconium silicate beads with the average particle diameter of 10-30 μm added to the friction material composition relative to the entire amount of the friction material composition is preferably 0.2-1 weight %.

In this invention, the average particle diameters represent 50% of the particle diameters measured by a Laser Diffraction Particle Size Analyzer.

Also, the fused silica is a silica particle made by melting pulverized raw silica rocks in a high-temperature flame to spheroidize by a surface tension. As the fused silica, a product such as Silica FB Series by Denka Co., Ltd. may be used.

Also, the electromelting zirconium silicate beads is a beads-shaped zirconium silicate that is manufactured by resolving a crystalline zirconia and an amorphous silicon oxide by an electromelting method. For the electromelting zirconium silicate beads, a product such as Micro Blast Series by Sait-Gobain Co., Ltd. may be used.

<Resilient Graphitic Carbon>

Furthermore, in this invention, it is preferable to add 1-4 weight % of a resilient graphitic carbon as the lubricant relative to the entire amount of the friction material composition.

As 1-4 weight % of the resilient graphitic carbon relative to the entire friction material composition is added to the friction material composition, the amount of the high compressibility increases, which improves the inhibitory effect of the brake vibration.

The resilient graphitic carbon is a carbon obtained through a process of expanding and foaming a carbon material made of either a carbon mesophase or cokes and then graphitizing at 1900-2700 centigrade to achieve the graphitization degree of 80-95% measured by the X-ray diffraction, which has a characteristic of a large recovery ratio of the volume when the load is removed after applying a compressive load. For the resilient graphitic carbon, a product such as RGC Series by Superior Graphite may be used.

<Other Components>

The friction material of this invention is made from the friction material composition containing materials that are normally used in the friction material such as the fiber base, the lubricant, the organic friction modifier, the inorganic friction modifier, the pH modifier, and the filler other than the binder, the cashew dust, the fused silica with the average particle diameter of 15-40 μm, the electromelting zirconium silicate beads with the average particle diameter of 10-30 μm, and the resilient graphitic carbon.

For the fiber base, either one of organic fibers that are generally used in the friction material such as an aramid fiber, a cellulose fiber, a polyparaphenylene benzobisoxazole fiber, and an acrylic fiber, or metallic fibers that are generally used for the friction material such as an aluminum fiber, an aluminum alloy fiber, and a zinc fiber, or a combination of two or more of the above-listed organic fibers or metallic fibers may be used.

The amount of the fiber base contained in the friction material composition relative to the entire amount of the friction material composition is preferably 1-5 weight % and is more preferably 1.5-3 weight %.

For the organic friction modifier, other than the above-described cashew dust, either one of the organic friction modifiers that are generally used in the friction material such as a tire tread rubber pulverized powder, a vulcanized rubbers or unvalcanized rubber such as a nitrile rubber, an acrylic rubber, a silicone rubber, a butyl rubber, and a fluorine rubber, or a combination of two or more of the above-identified friction modifiers may be used.

The amount of the organic friction modifier together with the above-described cashew dust contained in the friction material composition relative to the entire amount of the friction material composition is preferably 2-7 weight % and is more preferably 3-5 weight %.

For the inorganic friction modifier, other than the above-described fused silica with the average particle diameter of 15-40 μm and the electromelting zirconium silicate beads with the average particle diameter of 10-30 μm, either one of particle based inorganic friction modifiers that are generally used in the friction material composition such as a talc, a clay, a dolomite, a magnesia mica, a muscovite, a vermiculite, a triiron tetroxide, a calcium silicate hydrate, a glass bead, a zeolite, a mullite, a chromite, a titanium oxide, a magnesium oxide, a stabilized zirconia, a monoclinic zirconium oxide, a zirconium silicate other than the electromelting zirconium silicate beads, a γ-alumina, an α-alumina, a silicon carbide, aluminum particles, iron particles, zinc particles, tin particles, a non-whisker-like (plate-like, columnar, squamous, irregular/indefinite shape with multiple projections) titanate (potassium hexatitanate, potassium octatitanate, lithium potassium titanate, magnesium potassium titanate), or fiber based inorganic friction modifiers that are generally used in the friction material composition such as a wollastonite, a sepiolite, a basalt fiber, a glass fiber, a biosolubable artificial mineral fiber, and a rock wool, or a combination of two or more of the above-identified fibers may be used.

The amount of the inorganic friction modifier contained in the friction material composition together with the above-described fused silica with the average particle diameter of 15-40 μm and the electromelting zirconium silicate beads with the average particle diameter of 10-30 μm relative to the entire amount of the friction material composition is preferably 40-70 weight % and is more preferably 50-60 weight %.

For the lubricant, other than the above-described resilient graphitic carbon, either one of metal sulfide lubricant such as a molybdenum disulfide, a tin sulfide, a zinc sulfide, a bismuth sulfide, a tungsten sulfide, and a composite metal sulfide, or carbon based lubricants such as an artificial graphite, a natural graphite, a flake graphite, a petroleum coke, an active carbon, and a polyacrylonitrile oxide fiber pulverized powder, or a combination of two or more of the above-identified lubricants may be used.

The amount of the lubricant contained in the friction material composition together with the above-described resilient graphitic carbon relative to the entire amount of the friction material composition is preferably 5-13 weight % and is more preferably 7-11 weight %.

For the pH modifier, the pH modifiers that are generally used in the friction material such as the calcium hydroxide may be used.

The amount of the pH modifier contained in the friction material composition relative to the entire amount of the friction material composition is preferably 1-5 weight % and is more preferably 2-4 weight %.

For the remaining components of the friction material composition, the fillers such as the barium sulfide and the calcium carbonate may be used.

The friction material of this invention for the disc brake is manufactured through steps including a mixing step for mixing the predetermined amount of the friction material composition uniformly by a mixer, a heat-press-forming step for superposing the obtained raw friction material mixture on a separately pre-washed, pre-surface-treated, and adhesive-coated back plate to be positioned in a heat forming die and heat-press-forming the obtained raw friction material mixture and the back plate, a heat treatment step for heating the obtained molded item to complete curing reaction of the binder therein, an electrostatic powder coating step for coating a powder coating, a coating baking step for baking the coating, and a grinding step for grinding the friction surface by a rotary grinding wheel. Also, after the heat-press-forming step, the manufacturing process may go through the coating step, the heat treatment step including the coating baking step, and the grinding step in the respective order.

As necessary, prior to the heat-press-forming step, a granulation step for granulating the raw friction material mixture, or a kneading step for kneading the raw friction material mixture, and a pre-forming step for setting the obtained raw friction material mixture or the granulated substance obtained through the granulation step or the kneaded substance obtained through the kneading step in a pre-forming die to process the pre-forming step to produce a preformed intermediate item, may be performed and a scorching step may be performed after the heat-press-forming step.

EMBODIMENTS

In the following sections, the embodiments and the comparative examples are explained concretely; however, this invention is not limited to the following embodiments.

Manufacturing Method for Friction Material in Embodiments 1-19 and Comparative Examples 1-14

The friction material compositions having compositions shown in Table 1, Table 2, Table 3, and Table 4 are mixed for about 5 minutes by Loedige mixer and are pressed in a forming die under 30 MPa for about 10 minutes to perform the pre-forming. The obtained preformed intermediate item is superposed on the pre-washed, pre-surface-treated, and adhesive-coated back plate to be positioned together in the heat forming die for forming at the forming temperature of 150 centigrade under the forming pressure of 40 MPa for about 10 minutes and then to be heat-treated (post cured) at 200 centigrade for about 5 hours, and the friction surface is grinded to manufacture the disc brake pad for a passenger vehicle (Embodiments 1-19 and Comparative Examples 1-14).

TABLE 1

|  |  | Embodiments |  |  |  |  |  |  |  |  |  |
|---|---|---|---|---|---|---|---|---|---|---|---|
|  |  | 1 | 2 | 3 | 4 | 5 | 6 | 7 | 8 | 9 | 10 |
| Binder | Straight Phenol Resin | 6.0 | 3.0 | 3.0 | 7.0 | 5.0 | 5.0 | 5.0 | 5.0 | 5.0 | 5.0 |
|  | Silicon Rubber Modified Phenol Resin | 1.0 | 4.0 | 2.0 | 2.0 | 2.0 | 2.0 | 2.0 | 2.0 | 2.0 | 2.0 |
| Fiber Base | Aramid Fiber | 2.0 | 2.0 | 2.0 | 2.0 | 2.0 | 2.0 | 2.0 | 2.0 | 2.0 | 2.0 |
| Lubricant | Resilient Graphitic Carbon | 2.0 | 2.0 | 2.0 | 2.0 | 2.0 | 2.0 | 2.0 | 2.0 | 2.0 | 2.0 |
|  | Graphite | 5.0 | 5.0 | 5.0 | 5.0 | 5.0 | 5.0 | 5.0 | 5.0 | 5.0 | 5.0 |
|  | Molybdenum Disulfide | 4.0 | 4.0 | 4.0 | 4.0 | 4.0 | 4.0 | 4.0 | 4.0 | 4.0 | 4.0 |

TABLE 1-continued

|  |  | Embodiments | | | | | | | | | |
|---|---|---|---|---|---|---|---|---|---|---|---|
|  |  | 1 | 2 | 3 | 4 | 5 | 6 | 7 | 8 | 9 | 10 |
| Inorganic Friction Modifier | Zirconium Oxide | 20.0 | 20.0 | 20.0 | 20.0 | 20.0 | 20.0 | 20.0 | 20.0 | 20.0 | 20.0 |
|  | Magnesia Mica | 10.0 | 10.0 | 10.0 | 10.0 | 10.0 | 10.0 | 10.0 | 10.0 | 10.0 | 10.0 |
|  | Potassium Hexatitanate | 20.0 | 20.0 | 20.0 | 20.0 | 20.0 | 20.0 | 20.0 | 20.0 | 20.0 | 20.0 |
|  | Triiron Tetroxide | 5.0 | 5.0 | 5.0 | 5.0 | 5.0 | 5.0 | 5.0 | 5.0 | 5.0 | 5.0 |
|  | Biosokubable Artificial Mineral Fiber | 1.0 | 1.0 | 1.0 | 1.0 | 1.0 | 1.0 | 1.0 | 1.0 | 1.0 | 1.0 |
|  | Fused Silica (Average Particle Diameter of 10 μm) |  |  |  |  |  |  |  |  |  |  |
|  | Fused Silica (Average Particle Diameter of 15 μm) |  |  |  |  |  |  | 2.0 |  |  |  |
|  | Fused Silica (Average Particle Diameter of 25 μm) | 2.0 | 2.0 | 2.0 | 2.0 | 2.0 | 2.0 |  | 2.0 |  | 0.5 |
|  | Fused Silica (Average Particle Diameter of 40 μm) |  |  |  |  |  |  |  |  | 2.0 |  |
|  | Fused Silica (Average Particle Diameter of 45 μm) |  |  |  |  |  |  |  |  |  |  |
|  | Electromelting Zirconium Silicate Beads (Average Particle Diameter of 5 μm) |  |  |  |  |  |  |  |  |  |  |
|  | Electromelting Zirconium Silicate Beads (Average Particle Diameter of 10 μm) |  |  |  |  |  |  |  |  |  |  |
|  | Electromelting Zirconium Silicate Beads (Average Particle Diameter of 15 μm) | 0.5 | 0.5 | 0.5 | 0.5 | 0.5 | 0.5 | 0.5 | 0.5 | 0.5 | 0.5 |
|  | Electromelting Zirconium Silicate Beads (Average Particle Diameter of 30 μm) |  |  |  |  |  |  |  |  |  |  |
|  | Electromelting Zirconium Silicate Beads (Average Particle Diameter of 35 μm) |  |  |  |  |  |  |  |  |  |  |
| Organic Friction Modifier | Tire Tread Rubber Pulverized Powder | 2.0 | 2.0 | 2.0 | 2.0 | 2.0 | 2.0 | 2.0 | 2.0 | 2.0 | 2.0 |
|  | Cashew Dust | 2.0 | 2.0 | 2.0 | 2.0 | 1.0 | 4.0 | 2.0 | 2.0 | 2.0 | 2.0 |
| pH Modifier | Calcium Hydroxide | 3.0 | 3.0 | 3.0 | 3.0 | 3.0 | 3.0 | 3.0 | 3.0 | 3.0 | 3.0 |
| Filler | Barium Sulfide | 14.5 | 14.5 | 16.5 | 12.5 | 15.5 | 12.5 | 14.5 | 14.5 | 14.5 | 16.0 |
| TOTAL |  | 100.0 | 100.0 | 100.0 | 100.0 | 100.0 | 100.0 | 100.0 | 100.0 | 100.0 | 100.0 |

TABLE 2

|  |  | Embodiments | | | | | | | | |
|---|---|---|---|---|---|---|---|---|---|---|
|  |  | 11 | 12 | 13 | 14 | 15 | 16 | 17 | 18 | 19 |
| Binder | Straight Phenol Resin | 5.0 | 5.0 | 5.0 | 5.0 | 5.0 | 5.0 | 5.0 | 5.0 | 5.0 |
|  | Silicon Rubber Modified Phenol Resin | 2.0 | 2.0 | 2.0 | 2.0 | 2.0 | 2.0 | 2.0 | 2.0 | 2.0 |
| Fiber Base | Aramid Fiber | 2.0 | 2.0 | 2.0 | 2.0 | 2.0 | 2.0 | 2.0 | 2.0 | 2.0 |
| Lubricant | Resilient Graphitic Carbon | 2.0 | 2.0 | 2.0 | 2.0 | 2.0 | 0.5 | 1.0 | 4.0 | 5.0 |
|  | Graphite | 5.0 | 5.0 | 5.0 | 5.0 | 5.0 | 5.0 | 5.0 | 5.0 | 5.0 |
|  | Molybdenum Disulfide | 4.0 | 4.0 | 4.0 | 4.0 | 4.0 | 4.0 | 4.0 | 4.0 | 4.0 |
|  | Zirconium Oxide | 20.0 | 20.0 | 20.0 | 20.0 | 20.0 | 20.0 | 20.0 | 20.0 | 20.0 |
|  | Magnesia Mica | 10.0 | 10.0 | 10.0 | 10.0 | 10.0 | 10.0 | 10.0 | 10.0 | 10.0 |
| Inorganic Friction Modifier | Potassium Hexatitanate | 20.0 | 20.0 | 20.0 | 20.0 | 20.0 | 20.0 | 20.0 | 20.0 | 20.0 |
|  | Triiron Tetroxide | 5.0 | 5.0 | 5.0 | 5.0 | 5.0 | 5.0 | 5.0 | 5.0 | 5.0 |
|  | Biosokubable Artificial Mineral Fiber | 1.0 | 1.0 | 1.0 | 1.0 | 1.0 | 1.0 | 1.0 | 1.0 | 1.0 |
|  | Fused Silica (Average Particle Diameter of 10 μm) |  |  |  |  |  |  |  |  |  |
|  | Fused Silica (Average Particle Diameter of 15 μm) |  |  |  |  |  |  |  |  |  |
|  | Fused Silica (Average Particle Diameter of 25 μm) | 3.0 | 2.0 | 2.0 | 2.0 | 2.0 | 2.0 | 2.0 | 2.0 | 2.0 |
|  | Fused Silica (Average Particle Diameter of 40 μm) |  |  |  |  |  |  |  |  |  |
|  | Fused Silica (Average Particle Diameter of 45 μm) |  |  |  |  |  |  |  |  |  |
|  | Electromelting Zirconium Silicate Beads (Average Particle Diameter of 5 μm) |  |  |  |  |  |  |  |  |  |

TABLE 2-continued

|  |  | Embodiments | | | | | | | | |
|  |  | 11 | 12 | 13 | 14 | 15 | 16 | 17 | 18 | 19 |
| --- | --- | --- | --- | --- | --- | --- | --- | --- | --- | --- |
|  | Electromelting Zirconium Silicate Beads (Average Particle Diameter of 10 μm) |  | 0.5 |  |  |  |  |  |  |  |
|  | Electromelting Zirconium Silicate Beads (Average Particle Diameter of 15 μm) | 0.5 |  |  | 0.1 | 2.0 | 0.5 | 0.5 | 0.5 | 0.5 |
|  | Electromelting Zirconium Silicate Beads (Average Particle Diameter of 30 μm) |  |  | 0.5 |  |  |  |  |  |  |
|  | Electromelting Zirconium Silicate Beads (Average Particle Diameter of 35 μm) |  |  |  |  |  |  |  |  |  |
| Organic Friction Modifier | Tire Tread Rubber Pulverized Powder | 2.0 | 2.0 | 2.0 | 2.0 | 2.0 | 2.0 | 2.0 | 2.0 | 2.0 |
|  | Cashew Dust | 2.0 | 2.0 | 2.0 | 2.0 | 2.0 | 2.0 | 2.0 | 2.0 | 2.0 |
| pH Modifier | Calcium Hydroxide | 3.0 | 3.0 | 3.0 | 3.0 | 3.0 | 3.0 | 3.0 | 3.0 | 3.0 |
| Filler | Barium Sulfide | 13.5 | 14.5 | 14.5 | 14.9 | 13.0 | 16.0 | 15.5 | 12.5 | 11.5 |
| TOTAL |  | 100.0 | 100.0 | 100.0 | 100.0 | 100.0 | 100.0 | 100.0 | 100.0 | 100.0 |

TABLE 3

|  |  | Embodiments | | | | | | |
|  |  | 1 | 2 | 3 | 4 | 5 | 6 | 7 |
| --- | --- | --- | --- | --- | --- | --- | --- | --- |
| Binder | Straight Phenol Resin | 6.5 | 2.0 | 2.0 | 8.0 | 5.0 | 5.0 | 5.0 |
|  | Silicon Rubber Modified Phenol Resin | 0.5 | 5.0 | 2.0 | 2.0 | 2.0 | 2.0 | 2.0 |
| Fiber Base | Aramid Fiber | 2.0 | 2.0 | 2.0 | 2.0 | 2.0 | 2.0 | 2.0 |
| Lubricant | Resilient Graphitic Carbon | 2.0 | 2.0 | 2.0 | 2.0 | 2.0 | 2.0 | 2.0 |
|  | Graphite | 5.0 | 5.0 | 5.0 | 5.0 | 5.0 | 5.0 | 5.0 |
|  | Molybdenum Disulfide | 4.0 | 4.0 | 4.0 | 4.0 | 4.0 | 4.0 | 4.0 |
| Inorganic Friction Modifier | Zirconium Oxide | 20.0 | 20.0 | 20.0 | 20.0 | 20.0 | 20.0 | 20.0 |
|  | Magnesia Mica | 10.0 | 10.0 | 10.0 | 10.0 | 10.0 | 10.0 | 10.0 |
|  | Potassium Hexatitanate | 20.0 | 20.0 | 20.0 | 20.0 | 20.0 | 20.0 | 20.0 |
|  | Triiron Tetraoxide | 5.0 | 5.0 | 5.0 | 5.0 | 5.0 | 5.0 | 5.0 |
|  | Biosokubable Artificial Mineral Fiber | 1.0 | 1.0 | 1.0 | 1.0 | 1.0 | 1.0 | 1.0 |
|  | Fused Silica (Average Particle Diameter of 10 μm) |  |  |  |  |  |  | 2.0 |
|  | Fused Silica (Average Particle Diameter of 15 μm) |  |  |  |  |  |  |  |
|  | Fused Silica (Average Particle Diameter of 25 μm) | 2.0 | 2.0 | 2.0 | 2.0 | 2.0 | 2.0 |  |
|  | Fused Silica (Average Particle Diameter of 40 μm) |  |  |  |  |  |  |  |
|  | Fused Silica (Average Particle Diameter of 45 μm) |  |  |  |  |  |  |  |
|  | Electromelting Zirconium Silicate Beads (Average Particle Diameter of 5 μm) |  |  |  |  |  |  |  |
|  | Electromelting Zirconium Silicate Beads (Average Particle Diameter of 10 μm) |  |  |  |  |  |  |  |
|  | Electromelting Zirconium Silicate Beads (Average Particle Diameter of 15 μm) | 0.5 | 0.5 | 0.5 | 0.5 | 0.5 | 0.5 | 0.5 |
|  | Electromelting Zirconium Silicate Beads (Average Particle Diameter of 30 μm) |  |  |  |  |  |  |  |
|  | Electromelting Zirconium Silicate Beads (Average Particle Diameter of 35 μm) |  |  |  |  |  |  |  |
| Organic Friction Modifier | Tire Tread Rubber Pulverized Powder | 2.0 | 2.0 | 2.0 | 2.0 | 2.0 | 2.0 | 2.0 |
|  | Cashew Dust | 2.0 | 2.0 | 2.0 | 2.0 | 0.5 | 5.0 | 2.0 |
| pH Modifier | Calcium Hydroxide | 3.0 | 3.0 | 3.0 | 3.0 | 3.0 | 3.0 | 3.0 |
| Filler | Barium Sulfide | 14.5 | 14.5 | 17.5 | 11.5 | 16.0 | 11.5 | 14.5 |
| TOTAL |  | 100.0 | 100.0 | 100.0 | 100.0 | 100.0 | 100.0 | 100.0 |

TABLE 4

|  |  | Embodiments | | | | | | |
|---|---|---|---|---|---|---|---|---|
|  |  | 8 | 9 | 10 | 11 | 12 | 13 | 14 |
| Binder | Straight Phenol Resin | 5.0 | 5.0 | 5.0 | 5.0 | 5.0 | 5.0 | 5.0 |
|  | Silicon Rubber Modified Phenol Resin | 2.0 | 2.0 | 2.0 | 2.0 | 2.0 | 2.0 | 2.0 |
| Fiber Base | Aramid Fiber | 2.0 | 2.0 | 2.0 | 2.0 | 2.0 | 2.0 | 2.0 |
| Lubricant | Resilient Graphitic Carbon | 2.0 | 2.0 | 2.0 | 2.0 | 2.0 | 2.0 | 2.0 |
|  | Graphite | 5.0 | 5.0 | 5.0 | 5.0 | 5.0 | 5.0 | 5.0 |
|  | Molybdenum Disulfide | 4.0 | 4.0 | 4.0 | 4.0 | 4.0 | 4.0 | 4.0 |
| Inorganic Friction Modifier | Zirconium Oxide | 20.0 | 20.0 | 20.0 | 20.0 | 20.0 | 20.0 | 20.0 |
|  | Magnesia Mica | 10.0 | 10.0 | 10.0 | 10.0 | 10.0 | 10.0 | 10.0 |
|  | Potassium Hexatitanate | 20.0 | 20.0 | 20.0 | 20.0 | 20.0 | 20.0 | 20.0 |
|  | Triiron Tetroxide | 5.0 | 5.0 | 5.0 | 5.0 | 5.0 | 5.0 | 5.0 |
|  | Biosokubable Artificial Mineral Fiber | 1.0 | 1.0 | 1.0 | 1.0 | 1.0 | 1.0 | 1.0 |
|  | Fused Silica (Average Particle Diameter of 10 μm) |  |  |  |  |  |  |  |
|  | Fused Silica (Average Particle Diameter of 15 μm) |  |  |  |  |  |  |  |
|  | Fused Silica (Average Particle Diameter of 25 μm) |  | 0.3 | 4.0 | 2.0 | 2.0 | 2.0 | 2.0 |
|  | Fused Silica (Average Particle Diameter of 40 μm) |  |  |  |  |  |  |  |
|  | Fused Silica (Average Particle Diameter of 45 μm) | 2.0 |  |  |  |  |  |  |
|  | Electromelting Zirconium Silicate Beads (Average Particle Diameter of 5 μm) |  |  |  |  |  |  |  |
|  | Electromelting Zirconium Silicate Beads (Average Particle Diameter of 10 μm) |  |  |  | 0.5 |  |  |  |
|  | Electromelting Zirconium Silicate Beads (Average Particle Diameter of 15 μm) | 0.5 | 0.5 | 0.5 |  |  | 0.05 | 3.0 |
|  | Electromelting Zirconium Silicate Beads (Average Particle Diameter of 30 μm) |  |  |  |  | 0.5 |  |  |
|  | Electromelting Zirconium Silicate Beads (Average Particle Diameter of 35 μm) |  |  |  |  |  |  |  |
| Organic Friction Modifier | Tire Tread Rubber Pulverized Powder | 2.0 | 2.0 | 2.0 | 2.0 | 2.0 | 2.0 | 2.0 |
|  | Cashew Dust | 2.0 | 2.0 | 2.0 | 2.0 | 2.0 | 2.0 | 2.0 |
| pH Modifier | Calcium Hydroxide | 3.0 | 3.0 | 3.0 | 3.0 | 3.0 | 3.0 | 3.0 |
| Filler | Barium Sulfide | 14.5 | 16.2 | 12.5 | 14.5 | 14.5 | 14.95 | 12.0 |
| TOTAL |  | 100.0 | 100.0 | 100.0 | 100.0 | 100.0 | 100.0 | 100.0 |

The obtained friction material is tested to evaluate the braking effectiveness in the normal use range, the fading resistance, the brake vibration during braking in a high temperature, the wear resistance, and the brake noise.

<Braking Effectiveness>

In conformity to JASO C406, "Passenger Car Brake Dynamo Meter Method", the average value of the friction coefficient at the vehicle speed of 130 km/h and the deceleration speed of 0.3 G in the second effect test is evaluated under the following evaluation standards.

Excellent: 0.40 or higher
Good: 0.37 or higher but less than 0.40
Pass: 0.34 or higher but less than 0.37
Fail: less than 0.34

<Fading Resistance>

In conformity to JASO C406, "Passenger Car Brake Dynamo Meter Method", the minimum friction coefficient in the first fade test is evaluated under the following evaluation standards.

Excellent: 0.3 or more
Good: 0.25 or more but less than 0.30
Pass: 0.20 or more but less than 0.25
Fail: less than 0.20

<Brake Vibration During Braking in a High Temperature>

In conformity to JASO C402, "General Brake Test Method for Passenger Cars", the noise and vibration at the fading test are checked and evaluated under the following evaluation standards.

Excellent: no noise and vibration
Good: very slight noise and vibration
Pass: slight noise and vibration but in an acceptable range
Fail: noise and vibration not in an acceptable range <Wear Resistance>

In conformity to JASO C427, "Automobile Parts-Brake Lining and Disc Brake Pad-Wear Test Procedure on Inertia Dynamometer", the amount of wear of the friction material (shown by millimeter or mm) is measured at the initial speed of braking of 50 km/h and the deceleration speed of braking of 0.3 G with the suitable number of brake actions under the brake temperature before braking of 200 centigrade, and after converting the obtained measurement into the amount of wear at 1000 braking time, the value is evaluated under the following evaluation standards.

Excellent: less than 0.15 mm
Good: 0.15 mm or more and less than 0.20 mm
Pass: 0.20 mm or more and less than 0.50 mm Fail: 0.50 mm or more <Brake Noise>

In conformity to JASO C402, "General Brake Test Method for Passenger Cars", the actual brake noise test is performed, and the brake noise occurrence rate is evaluated under the following evaluation standards.

Excellent: 0%
Good: more than 0% but less than 5%
Pass: 5% or more but less than 10%
Fail: more than 10%

The evaluation results are shown in Table 5, Table 6, Table 7, and Table 8.

TABLE 5

|  |  | Embodiments | | | | | | | | | |
|---|---|---|---|---|---|---|---|---|---|---|---|
|  |  | 1 | 2 | 3 | 4 | 5 | 6 | 7 | 8 | 9 | 10 |
| Performance Evaluation | Braking Effectiveness | E | E | E | E | P | E | E | E | E | E |
|  | Fading Resistance | E | P | E | P | E | G | E | E | E | E |
|  | Brake Vibration at the Time of Braking in a High Temperature | P | E | E | E | E | P | P | E | E | P |
|  | Wear Resistance | E | G | P | E | E | G | E | E | G | E |
|  | Brake Noise | G | E | E | E | G | E | E | E | P | E |

E = Excellent
G = Good
P = Pass
F = Fail

TABLE 6

|  |  | Embodiments | | | | | | | | |
|---|---|---|---|---|---|---|---|---|---|---|
|  |  | 11 | 12 | 13 | 14 | 15 | 16 | 17 | 18 | 19 |
| Performance Evaluation | Braking Effectiveness | E | E | E | E | E | E | E | E | E |
|  | Fading Resistance | E | E | E | E | E | E | E | E | E |
|  | Brake Vibration at the Time of Braking in a High Temperature | E | P | E | P | E | P | G | E | E |
|  | Wear Resistance | G | E | P | E | P | E | E | G | P |
|  | Brake Noise | P | E | P | E | P | G | G | E | E |

E = Excellent
G = Good
P = Pass
F = Fail

TABLE 7

|  |  | Comparative Examples | | | | | | |
|---|---|---|---|---|---|---|---|---|
|  |  | 1 | 2 | 3 | 4 | 5 | 6 | 7 |
| Performance Evaluation | Braking Effectiveness | E | G | G | E | F | G | E |
|  | Fading Resistance | E | F | G | F | G | P | G |
|  | Brake Vibration at the Time of Braking in a High Temperature | F | E | E | E | E | F | F |
|  | Wear Resistance | E | P | F | E | E | P | E |
|  | Brake Noise | P | E | E | E | P | E | E |

E = Excellent
G = Good
P = Pass
F = Fail

TABLE 8

|  |  | Comparative Examples | | | | | | |
|---|---|---|---|---|---|---|---|---|
|  |  | 8 | 9 | 10 | 11 | 12 | 13 | 14 |
| Performance Evaluation | Braking Effectiveness | E | E | E | E | E | E | E |
|  | Fading Resistance | E | G | E | G | E | G | E |
|  | Brake Vibration at the Time of Braking in a High Temperature | E | F | E | F | E | F | E |
|  | Wear Resistance | P | E | P | E | F | E | F |
|  | Brake Noise | F | E | E | E | E | E | F |

E = Excellent
G = Good
P = Pass
F = Fail

As shown in the respective tables, the friction material composition satisfying the compositions of this invention achieves preferable evaluation results with respect to the braking effectiveness, the fading resistance, the brake vibration during braking in a high temperature, the wear resistance, and the brake noise.

INDUSTRIAL APPLICABILITY

This invention provides the friction material for a disc brake pad, which is manufactured by forming the NAO friction material composition that contains the binder, the fiber base, the organic friction modifier, the inorganic friction modifier, and the lubricant, while satisfying the laws and regulations regarding the amount of copper component contained in the friction material composition, and the friction material can restrain a brake vibration during braking in a high temperature, which provides a significant practical value.

The invention claimed is:

1. A friction material for a disc brake pad, which is manufactured by forming a Non-Asbestos-Organic (NAO) friction material composition that does not contain a copper component but contains a binder, a fiber base, an organic friction modifier, an inorganic friction modifier, and a lubricant, wherein said friction material composition contains 5-9 weight % of the binder relative to the entire amount of the friction material composition, 1-4 weight % of a silicone rubber modified phenol resin as a part of the binder relative to the entire amount of the friction material composition, 1-4 weight % of a cashew dust as the organic friction modifier relative to the entire amount of the friction material composition, 0.5-3 weight % of a fused silica with an average particle diameter of 15-40 μm as the inorganic friction modifier relative to the entire amount of the friction material composition, and 0.1-2 weight % of electromelting zirconium silicate beads with an average particle diameter of 10-30 μm as the inorganic friction modifier relative to the entire amount of the friction material composition.

2. The friction material according to claim 1, wherein said friction material composition contains 1-4 weight % of a resilient graphite cokes as the lubricant relative to the entire amount of the friction material composition.

* * * * *